May 25, 1943.  H. R. JACOBS  2,319,932
MEASURING INSTRUMENT
Filed March 5, 1942   3 Sheets-Sheet 1
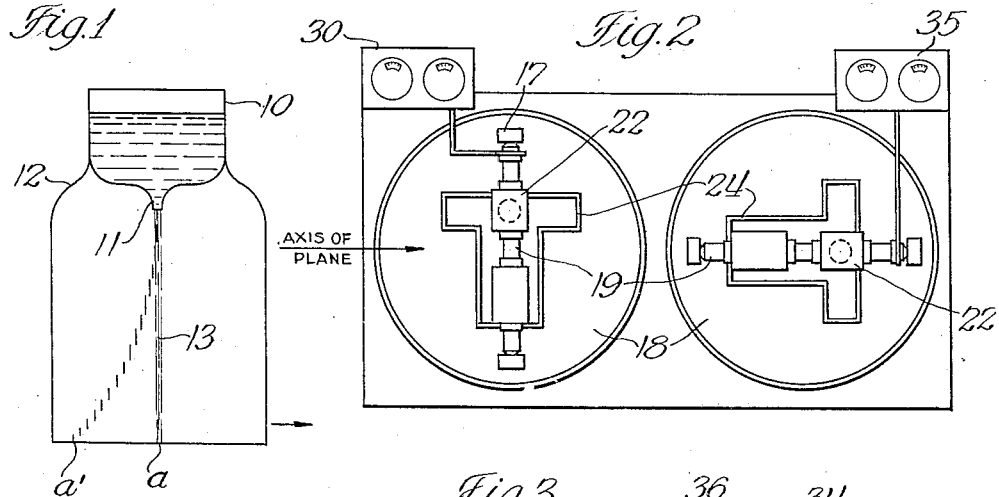
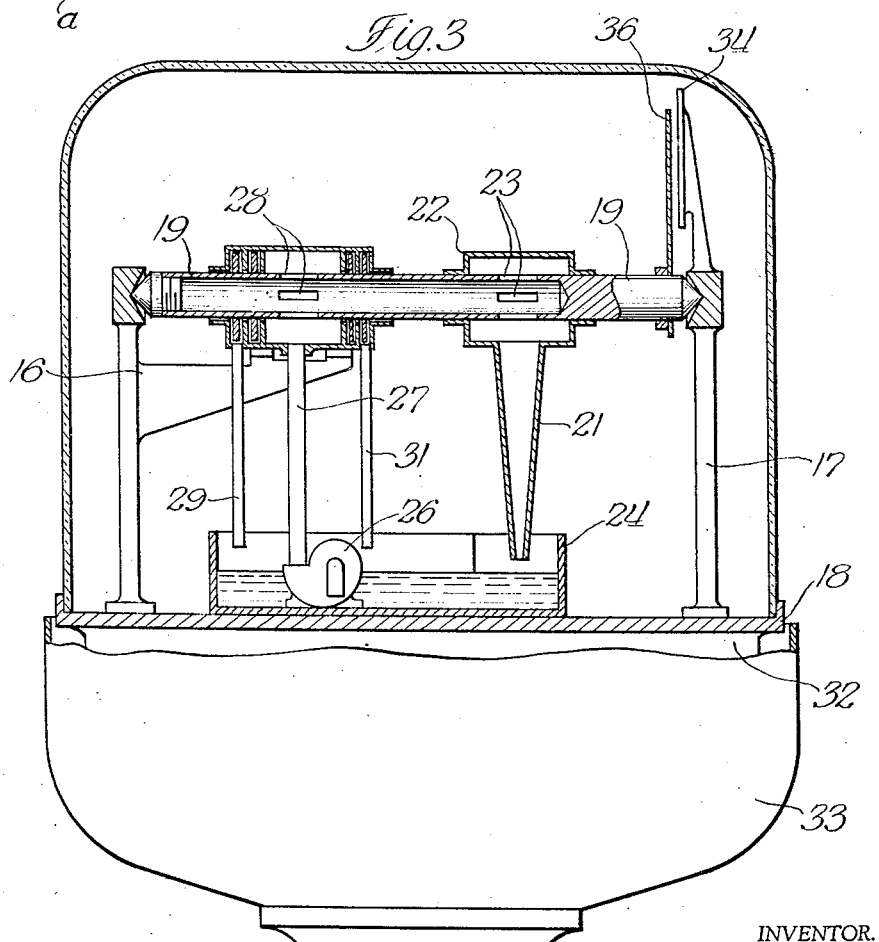
INVENTOR.
Henry R. Jacobs
BY McLaughlin & Wallenstein
attys.

May 25, 1943.  H. R. JACOBS  2,319,932
MEASURING INSTRUMENT
Filed March 5, 1942   3 Sheets-Sheet 2
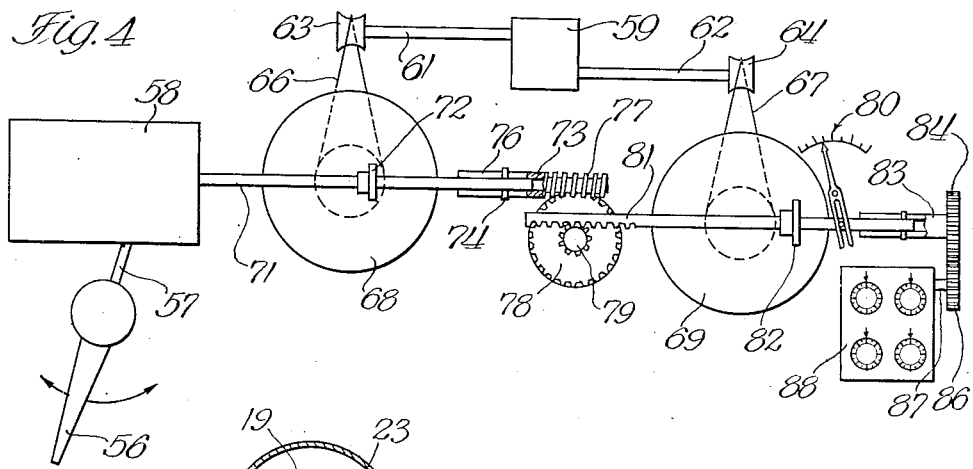
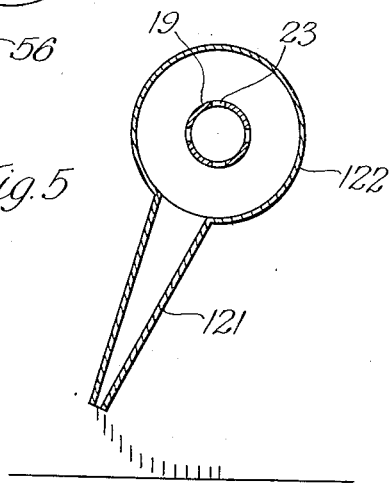
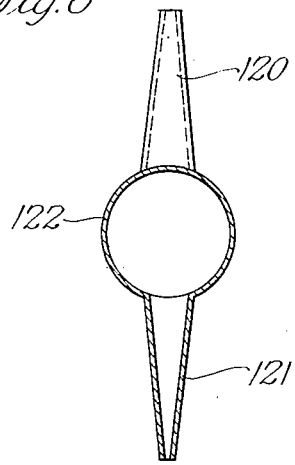
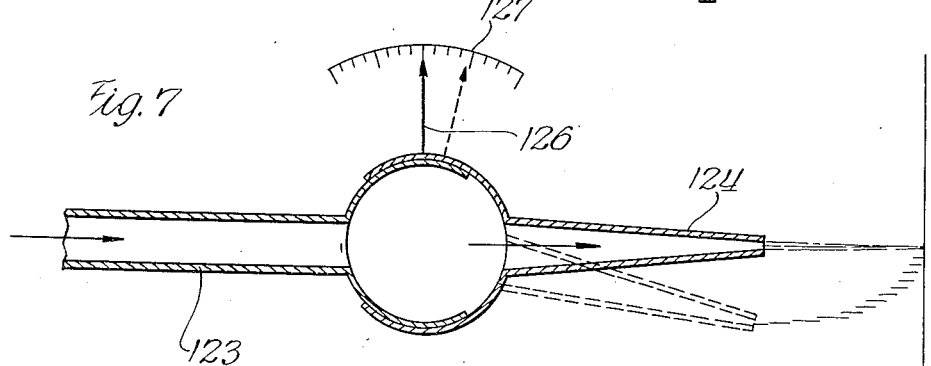
INVENTOR.
Henry R. Jacobs
BY McLaughlin & Wallenstein
Attys.

May 25, 1943.   H. R. JACOBS   2,319,932
MEASURING INSTRUMENT
Filed March 5, 1942   3 Sheets-Sheet 3
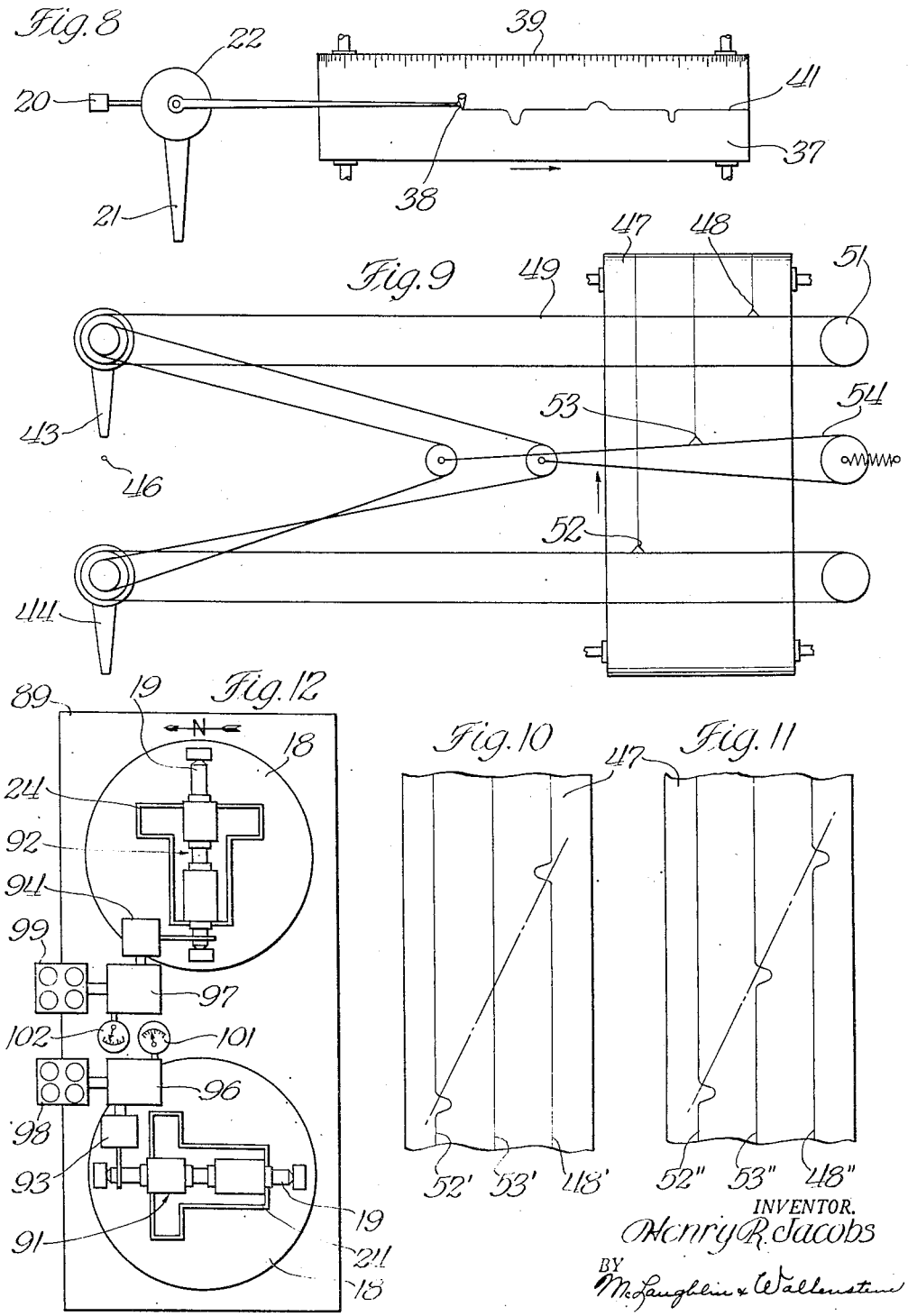

Patented May 25, 1943

2,319,932

UNITED STATES PATENT OFFICE 2,319,932

MEASURING INSTRUMENT

Henry R. Jacobs, Evanston, Ill.

Application March 5, 1942, Serial No. 433,423

3 Claims. (Cl. 264—1)

My invention relates to measuring instruments. It relates more in particular to novel means for measuring acceleration and the utilization of such acceleration means for determining related values, such as values involving other measurements such as distance and time.

The principal object of the invention is the provision of improved means for and method of detecting and indicating and/or recording accelerations and decelerations of a body such as a moving vehicle and the magnitude thereof.

A further object is to determine velocities attained by the vehicle in any given direction, such as ground speed or drift of an airplane.

A still further object is to determine accurately distances traversed by a vehicle along both the east and west and north and south axes, and to relate such distances to a known starting point, whereby to determine the position of the vehicle at any time.

My invention is particularly concerned with the control of airplanes and affording to the pilot needed information for navigation purposes, and will be described by reference thereto, it being understood, however, that the use of the invention on an airplane is entirely illustrative. By means of my invention, I am able to determine drift, actual ground speed and rate of climb without reference to any fixed object on the ground and independent of wind velocity and direction. From information afforded with respect to drift and velocity, the total distance travelled may be determined and the position of the airplane with respect to a known starting point can, at any time, be determined, or, if desired, may be constantly indicated. Since all of the information is secured without reference to the earth, except for the purpose of identifying the starting point, the device of my invention will find valuable applications in blind flying, night flying, stratosphere flying and the like; and when used in combination with other instruments, for example, a suitable altimeter, should be very valuable for carrying out such operations as blind bombings.

In carrying out my invention, I employ, as the sensitive element of an accelerometer, a freely flying body to which movement in a given direction may be imparted as will be explained hereinafter. A body in free flight, whether a falling body or projectile, is removed from all forces which would tend to divert it from its path until it reaches its objective, the only exception being such resistance as the body might encounter due to the presence of air. Once the body is placed in motion, no movements of its projector can affect its flight, with the result that, during its flight, it expresses exactly the direction given to it by its projector while it was within the projector or otherwise still under its influence. If aceleration is imparted to the projector after the freely flying body has escaped from it, the acceleration of the projector will not be shown by the body which first escaped from it, but by a second released body. A freely flying body will show acceleration and deceleration equally. Once a vehicle carrying a device making use of the principle of the freely flying body has accelerated to its maximum velocity, the accelerometer no longer shows acceleration but will occupy the same relative position that it had when the vehicle was at rest. By measuring the rate of acceleration and relating the obtained value to velocity and time, the absolute ground speed and distance travelled may be determined. This can be applied to the measuring of forward components, lateral components, as in the case of drift, and the like. By utilizing two devices placed at right angles to each other and maintaining the devices in horizontal and fixed directional position, as by mounting them on a platform controlled by a gyro-compass and gyro-stabilizer, or other suitable control mechanism, the position of the airplane with respect to a starting point may be constantly shown.

Additional objects and features of my invention will be described in connection with certain embodiments shown in the accompanying drawings.

In the drawings—

Fig. 1 is a diagrammatic view illustrating the principle employed in measuring acceleration, Fig. 2 illustrates a method of mounting two instruments at right angles to each other for the purpose of indicating two directions, Fig. 3 is a fragmentary vertical sectional view illustrating details of structure of one device of the type shown in Fig. 2, Fig. 4 is a partly diagrammatic view showing one manner of converting the acceleration and decleration values into figures showing absolute distance travelled, Fig. 5 is an enlarged view taken through the jet portion of the accelerometer, illustrating a position during a change in velocity, Fig. 6 shows a slightly modified construction, Fig. 7 illustrates one way of mounting the jet for the purpose of showing rate of climb, Fig. 8 illustrates a manner of associating an accelerometer and travelling tape to show drift, Fig. 9 shows a similar installation arranged, however, to include corrective factors, Figs. 10 and 11 show sample tapes made by the installation of Fig. 9, and Fig. 12 illustrates an arrangement adapted to show at any time the position of the vehicle with relation to its starting point.

Before referring to the embodiment of the device shown in the drawings, I shall refer to Fig. 1 for the purpose of explaining more in detail the principal of operation involved. Here we have a vessel 10 with a jet 11 through which liquid flows by gravity. A support 12 is provided which may comprise a vehicle. Assuming that the vehicle and vessel remain fixed, level and stationary and that water is allowed to flow continuously and smoothly through the jet 11, a freely flowing falling stream 13 will result and it will impinge upon a spot $a$ directly below the jet 11. If, now, acceleration is imparted to the entire device in the direction indicated by the arrow, the jet will, as long as acceleration is maintained, strike at a point $a'$. The position of the spot $a'$, it must be remembered, is determined by acceleration and not by velocity. The position of this spot $a'$ depends, also, upon the length of the falling column but this is a factor which is of no significance except from the standpoint of actual instrument design. It is important to remember, however, that it is not the velocity in which we are interested, at least in the first instance, but the rate of acceleration, expressed, for example, in terms of distance per second per second. When acceleration to the right ceases, and the vehicle has attained a constant velocity, no matter what that velocity may be, the stream 13 will again strike the spot $a$ and will continue to strike this spot so long as the velocity remains constant. Let us assume now that the vehicle is brought to a stop, that is to say, is decelerated. The water will now strike a spot to the right of the point $a$ until deceleration ceases, when it will again return to the point $a$. There is a fixed relation between the reaction to deceleration and acceleration. If the rates of acceleration and deceleration are identical, the distance at the side of the point $a$ where the stream will strike will be the same in each instance. As the rates of deceleration or acceleration vary, a relationship still exists equal to unity in the expression acceleration times time. In other words, the value acceleration times time will be the same in each instance.

In the above discussion, and in the following explanation, air resistance is disregarded. Needless to say, the freely flying body will be protected from direct exposure to air in motion, as by means of a fully enclosing shield, and corrective factors may be introduced if required. Operations may be carried on in vacuo if desired but I believe, for the most part, vacuum operation is not required.

A jet of the character described has some of the properties of a pendulum in that it may be considered as swinging in response to displacement of its support. This is only an apparent similarity with the pendulum, however, since the freely flying, or freely falling body, when gravity is involved, does not have the motion of a pendulum and will not continue to swing after it has been displaced in one direction. As soon as acceleration has ceased and velocity is constant, the point of impact of the liquid returns to the original position and there is no overswinging.

The principle employed is not dependent upon the use of water or any particular liquid, as oil, mercury, and other liquids may be employed. I may also employ discrete solid bodies such as shot or other particles; lubricating oil in the system associated with an internal combustion engine is illustrative of one type of liquid which may be employed. The body used depends upon design of equipment.

The movement of the freely flying body during acceleration and deceleration is required to be converted into some convenient form, preferably for visual observation but in any case in a form which is decipherable or can be related to desired values at a time after the acceleration or deceleration has occurred. Mechanical, electrical, photoelectrical, optical and other means may be employed. In the form of the invention disclosed in the drawings and hereinafter to be described, I obtain a mechanical movement by moving a relatively light mechanical element or elements in response to movement of the stream, such as by framing the jet within a tube or channel, and mounting the tube or channel so that it will respond to movement of the jet. The movement of the tube or channel is then utilized to convert acceleration to other related factors to obtain other values, such as absolute velocity, drift, total distance travelled and the like. Preferably, the mass of the tube or channel is relatively small as compared to the mass of the falling body so that as nearly as possible the tube reflects the absolute movement of the freely flying body as accurately as if it were entirely free as in the illustration of Fig. 1. While reference is made to "movement" of the tube, it should be remembered that the term is relative. Actually, the mounted or pivoted portion of the tube moves with the vehicle. The liquid, with the free end of the tube, remains in the original position, again using these terms in a relative and not an absolute sense.

The sensitivity of the device is increased by increasing the length of the tube and also by increasing the pressure of the water within the tube, providing, however, the construction must be such that there will be no tendency to impart movement to the tube by reason of the pressure of the incoming stream. The interior and exit end of the tube must also be made relatively smooth so as to avoid any interference which would have a tendency to force the tube to one side. If the pressure of the water is only great enough to fill the tube, that is to say, the water, in effect, falls only by gravity, then the tube might be made in a plurality of partially telescoping sections in order more closely to approximate the shape of a falling stream. While pressure of the stream is a factor so far as sensitivity is concerned, a properly constructed tube will have quite a wide range of pressures at which it may be operated without appreciably affecting its accuracy.

I shall first refer to Fig. 3 in order to illustrate one form of accelerometer device which may be utilized in the practice of my invention. As there shown, I maintain a pair of uprights 16 and 17 upon a table 18, the nature of which will be referred to hereinafter. A hollow, horizontal rod 19 is journalled suitably, such as in the manner shown, so as to swing freely between the uprights 16 and 17 and along the longitudinal axis of the rod. Fixed on the rod is a tube 21 having a communicating upper portion 22, which upper portion surrounds the rod 19 and acts as a feed chamber for the tube 21. Liquid is delivered to the interior of the rod 19 in a manner to be described and flows out through a number of ports 23 into the feed chamber. The ports 23 are illustrated as being four in number. They may, however, be any shape and size and have any distribution which maintains a balanced relation and does not tend to introduce pressure disturbance within the feed chamber such as would tend to move the tube 21. The fluid delivered from the tube 21 drops to an open receiving chamber 24. From the receiving chamber 24, it is withdrawn by means of a pump 26 through a pipe 27 and series of ports 28 to the interior of the rod 19. I employ a type of packing such as the ring type shown to avoid placing any restrictions on the free movement of the rod 19. With this type of packing there will be a small amount of overflow, the exact amount depending upon the pressure of the pump 26. A pair of overflow pipes 29 and 31 are provided so that any liquid over a predetermined calculated amount will be by-passed rather than be delivered to the tube 21. In this way, the pressure desired on the fluid in the tube 21 may be controlled.

The platform 18 is carried by a support 32 within a suitable housing 33 so constructed and arranged as to hold the platform 18 in a horizontal position. While it may be desired also to maintain the platform in directional alignment, in the relatively simple embodiment shown in Fig. 2, the arrangement is such that the platform 18 will be maintained horizontal and in alignment with the longitudinal axes of the plane. By this means, the acceleration in a forward direction can be indicated on one instrument and drift can be indicated on the other instrument. In order to show acceleration, a dial 34 is provided across which moves a pointer 36, the pointer 36 being carried by the rod 19 and serving, therefore, to indicate acceleration or deceleration as the case may be. Acceleration along the longitudinal axis of the plane is indirectly a measure of velocity, and may be made directly a measure of velocity. In the opposite direction, the movement of the instrument will show drift. Recording instruments 30 and 35 are provided for showing velocity and drift, respectively, and these instruments may be of suitable type such as shown in Figs. 4 or 8 of the drawings.

The principle of my invention may be utilized in various ways for the purpose of showing absolute velocity independently of air speed and the amount of drift. This may be done, for example, by a simple expedient, multiplying acceleration by time, which may be done mechanically. The maximum rate of acceleration may be recorded, if desired, such as by maintaining a pointer or other registering device at the position of maximum movement along a scale. If acceleration were instantaneous, the movement of the pointer 36 could be used as a direct measurement of velocity, but since acceleration, of necessity, is maintained for a measurable period of time, a source of error would be introduced if time were not included, and it is for this reason that the device must have a provision for including in the computation, the element of time. The acceleration and deceleration may be shown on a moving paper strip in such a way as to make it possible to determine actual ground speed at any time. The same principle applies whether velocity or drift are to be considered, and I call attention now to Figs. 8 to 11, inclusive, showing the recording of information in drift.

Referring first to Fig. 8, the numeral 37 identifies a travelling paper strip on which an inked stylus or pointer 38 bears, the stylus being carried on a tube 21 such as shown in Fig. 3, the axis of which corresponds with the longitudinal axis of the plane. A counterpoise 20 may be provided if required. A time track 39 is provided along the strip 37 and a mark such as indicated at 41 will be made by the stylus 38 as the paper strip 37 moves in the direction of the arrow. Assuming that the plane is travelling on a perfectly even keel and, for the moment, assuming that suitable correcting devices are not employed, the mark 41 will indicate true oscillation of the tube 21 and hence true drift of the plane. The position of the recorded oscillations will show the time when the drift originated, the acceleration and time thereof, as well as the duration of drift, that is the time up to the point where oscillation of equal time and magnitude in the opposite direction occurred. The space between oppositely facing oscillations, therefore, shows the time during which drift occurred (assuming the oppositely positioned oscillations are equal in the product acceleration times time) and the magnitude of the oscillation shows the acceleration at the time the drift started. Thus, from the track on the tape, all information required in connection with drift may be quite accurately calculated.

A drift indicator, of the type illustrated in Fig. 8, may comprise part of a navigation system and, if maintained in a horizontal position by means of a gyro-stabilizer, it will truly record drift in the manner indicated. Unless a gyro-stabilizer or other suitable means is employed to maintain the instrument in a horizontal position, however, errors will occur due to the fact that a roll along the horizontal axis of an airplane will be recorded on the tape in the same way that drift would be recorded. This may be corrected for, however, by utilizing the arrangement shown in Fig. 9. In this arrangement of the device, accelerometer tubes 43 and 44 of the type hereinabove described are placed at equal distance above and below the longitudinal axis of the airplane indicated at 46. A travelling tape 47 is provided having a time mark along one margin thereof. A stylus 48 is carried on a suitable chain or belt 49 trained over a pulley 51 and a suitable pulley carried by the accelerometer tube 43. A stylus 52 is similarly related to the accelerometer tube 44 and a stylus 53 is mounted on a suitable chain or belt 54 connected to but differentially affected by the movement of both accelerometer tubes 43 and 44 in the manner shown. It is obvious that if the airplane should begin to drift, both of the tubes will be displaced in the same direction but if the airplane should roll about its longitudinal axis the tubes will be displaced in opposite directions. Thus, in the event of a roll, a record such as shown in Fig. 10 will be made, the lines 52', 53' and 48' indicating the path of the styli 52, 53 and 48, respectively, on the tape 47. Fig. 11, on the other hand, shows corresponding stylus paths 52'', 53'' and 48'', clearly showing a record of a drift. The time mark will clearly show the time that the drift occurred as well as its magnitude.

Those skilled in the art may query the effect of other movements of the plane in ordinary flight such, for example, as the effect of a turn, and the manner of differentiating between a turn and drift. A perfectly executed banking turn from straight driftless flying will leave no record whatsoever, assuming, of course, that drift does not occur when the new direction is reached. The perfectly executed banking turn itself will not leave a mark. A skid turn will show as drift, but immediately upon coming out of the skid there will be an equal deceleration which would also record similarly to a drift. Two half loops, such as shown on the tapes, however, if occurring immediately adjacent each other, would be suspected of showing a skid. If, however, they actually did show drift it would necessarily have been accompanied with a change from a given direction and then back to the given direction. By using a gyro-stabilizer, the versatility of the instrument may be increased. By the conjoint use of a gyro-stabilizer it is possible to determine with no possibility of error that a bank has taken place, and a bank, as a rule, will be accompanied by a change in direction and usually accompanied by a change in both velocity and drift factors unless we assume absolutely stagnant air conditions. With time marks on a tape, a valuable additional record is made for navigation purposes even though the device of the present invention is not employed to afford the maximum advantage possible in determination of position.

By means of my invention, as previously noted, I am able to determine, at any time, the exact position of an airplane with relation to its starting point. This can be determined without reference to the ground, without aid from any instrument on the ground, and, if need be, without the necessity of making any calculations. In connection with this aspect of the invention, I wish now to refer to Fig. 4.

An accelerometer tube 56 is provided with an upwardly extending motion translating arm 57 leading to a power amplifier 58. The power amplifier may be electric, electro-mechanical, or of any suitable type; but preferably it should be of such a character as to amplify movement as well as power whereby to obtain greater accuracy in the intelligence translating device associated therewith. A constant speed motor 59 has a pair of shafts 61 and 62 carrying pulleys 63 and 64 which, through belts 66 and 67, drive discs 68 and 69, respectively, at constant speed. Extending from the power amplifier 58 is a rod 71 carrying a friction pinion 72, the rod being slidably related to a worm carrying sleeve 73 and adapted to drive the same through suitable means such as a pin 74 disposed in oppositely positioned slots 76 of the sleeve. The worm 77 drives a worm wheel 78 and a pinion 79 integral with the worm wheel meshes with a rack formed on a rod 81. The rod 81 carries a friction pinion 82 and slides in a sleeve 83 with which it is associated in drive relation in the manner described in connection with the sleeve 73. The sleeve 83 carries a gear 84 meshing with a second gear 86 carried on a shaft 87 of a counting or computing device 88. It should be obvious from the immediately following description of the operation, that various mechanical equivalents may be employed without departing from the invention. For example, cones and other drive mechanisms may be used for the discs 68 and 69, the gear forms may vary and other mechanical and physical changes may be made, all within the scope of the invention as defined in the claims.

The power amplifier, as previously noted, is preferably of such a character that movement is also amplified. It is desirable that as small a load as possible be carried by the accelerometer tube and I, therefore, prefer a type of amplifying device wherein the arm 57 controls an electrical function as, for example, it may change the value of a resistance, change the coupling between a pair of induction coils, modify a capacity value as between plates of a variable condenser or the like; and thereby through an amplifying circuit, by means of relays, through the use of photo cells, or in other ways known in the art, move the rod 71 to the left or right, depending upon the action of the accelerometer tube. I may, for example, employ a small reversing motor, certain types of solenoids, and other electrical or electro-mechanical devices commonly used in industry, all in such a way as to permit supporting the rod 71 rotationally while still advancing it or retracting it longitudinally in response to movement of the accelerometer tube. Since power amplifying and, if desired, movement amplifying devices of the type referred to are well known and the particular construction thereof is not a part of this invention, I shall not refer to them in further detail.

The position to which the friction pinion 72 is advanced indicates the acceleration, at a given moment, of the vehicle, assuming now that the device is set up to show forward velocity. In the position of no acceleration, the friction pinion 72 will be in dead center of the disc 68. Since the disc 68 is being driven at constant speed, then acceleration times time becomes a measure of velocity. The speed at which the rod 71 is driven is determined by the position of the friction pinion 72 away from center. The time during which the rod 71 is rotated and the speed of rotation as multiples of each other, are reflected in the position of the rack 81 and, therefore, of the friction pinion 82. Since there will be an opposite movement in the event of deceleration, then the position of the friction pinion 82 with respect to the dead center of the disc 69 is, at any given instant, a measure of the velocity. A velocity meter 80 is provided, responsive, as indicated, to the position of the pinion 82. Velocity times being equivalent to distance travelled, then the constant or time speed at which the disc 69 rotates times the velocity, determined by the position of the friction pinion 82, determines the total distance travelled. This is registered in the counting device 88 in miles, if desired, but preferably in some arbitrary units which are readily converted into miles so that calibration is facilitated. Thus, without reference to air speed and the correction thereof to show ground speed as in the usual practice, a device constructed as in Fig. 4 not only shows the velocity at any given time but also the total distance travelled in a forward direction. By utilizing only a portion of the device and registering the position of the friction pinion 82 on a suitable dial, the device may be employed solely as a ground speed indicator. Drift may also occur, obviously, but drift will be shown by another unit.

Referring now to Fig. 12: I show a support 89 maintained in a horizontal position by suitable means such as a gyro-stabilizer and also held orientated in a north and south direction independently of the position of the airplane. Shown schematically on the support 89 are accelerometer units 91 and 92 of the type disclosed, amplifier units 93 and 94, translating devices 96 and 97 of the type illustrated in Fig. 4 and counting or accumulating devices 98 and 99. Speed or velocity meters 101 and 102 are provided and it should be noted that each one is constructed to show speeds in either one of two directions. Assuming the support is maintained in a north pointing position as shown by the arrow, then the accelerometer 92 will show accelerations or decelerations in a north and south direction and the unit 91 will show accelerations or decelerations in a west and east direction quite independently of whether the accelerations may be caused by changes in forward speed or drift. The meter 102, similarly, will show velocity in either a north or south direction, quite independently as to whether it may be due to forward speed or drift. Through the mechanism shown, the counter 99 will show a relative position north or south of a starting point and the counter 98 a relative position east or west of a starting point. If it were desired to have the airplane move two hundred miles north and one hundred miles west of a given starting point, the counters 98 and 99 will properly show when the location is reached independently of the direction taken by the airplane to reach the designated point. The airplane might travel in ever widening circles to reach the desired point and the instrument will continue to add and subtract until the proper position is finally shown.

While imperfections may occur in an individual instrument, an instrument may be calibrated by flying it over a definite course; and since a well made instrument will repeat its own performance, it may then be used as calibrated to locate a new position and always will reverse itself and bring the pilot back to the original starting point. Thus, an airplane may be navigated successfully without reference to the ground, and altitude being determined, "blind bombings" of considerable accuracy may be carried out independently of the weather at the objective. While I have not illustrated it, those skilled in the art will understand that there are various ways in which the relative movements of the parts may be translated into terms identifying the position of the airplane with respect to a starting point such as by moving a map with respect to a fixed position, or moving a point with respect to a map when the map is calibrated for use with the instrument. This is merely a question of mechanics, once the relatively moving members to show north and south by east and west movement are available. Since I am not at present concerned with the mechanics of such an installation, it will not be described further.

For the purpose of making clearer to those skilled in the art the operation of the accelerometer tube of my invention, I wish to refer now to Figs. 5 to 7, inclusive. Fig. 5 may be considered as embodying the accelerometer tube unit shown in Fig. 3 and comprises a tube 121 and an upper communicating chamber 122 to which a fluid is delivered continuously in a manner previously discussed. As indicated by the position of the broken lines at the bottom of the tube, water falling from the tube will always fall vertically downwardly even though a counterpoise 120 is provided as illustrated in Fig. 6, providing, of course, that the counterpoise only balances the weight of the tube and not the weight of the tube plus the weight of the water or other fluid used. In the form of device where the liquid discharges downwardly the liquid behaves as a falling body and the tube 121, being part of a device which is relatively light as compared to the liquid, will readily shape itself to the position which the liquid will assume, and this occurs even though there may be pressure behind the incoming water. In all instances except where acceleration or deceleration are occurring, therefore, the tube 121 will point downwardly even though it is quite well counterbalanced.

In Fig. 7 I show a modification wherein a nozzle 123 delivers water under pressure in the form of a stream to a tube 124 pivoted in the manner shown at the outlet end of the nozzle 123. The tube 124 being relatively light and the stream being discharged horizontally at a relatively high rate of speed, the tube 124 will be held upright by the stream. If, now, the entire device is moved upwardly rapidly, the stream, following the principle of the freely flying body, will move downwardly and the tube 124 will drop to a lower position. A pointer 126 mounted on tube 124, under such circumstances, can show on a suitably designed scale 127, the rate of climb of an airplane.

It will be seen from the above description that the principle of the freely flying body may be utilized in various ways in accordance with my invention to yield any type of information wherein knowledge of a change of speed (and I employ this term in the specification as well as in the claims to include a position of rest) is a factor involved in a calculation. The invention may be thought of as involving a vehicle, a projector, a target (this may take various forms and comprise ony a virtual target) and a plurality of freely flying bodies, with the vehicle, projector and target moving at the same speed. We may think of a liquid as comprising an infinite number of very small particles, but for the purpose of considering the broadest aspects of the invention, let us consider a plurality of freely flying bodies which individually have appreciable mass. Should separate freely flying bodies be employed, it is either necessary that the distance between successively projected bodies be uniform or that a known calculatable relationship exist between them. Let us imagine a projector pointed at right angles to the direction of movement of a vehicle and assume, also, that it requires ten seconds for a projected body, such as a lead pellet, to reach the target and that such pellets are projected at the rate of one each second. Assume, now, that the vehicle has a velocity of X and that over a period of ten seconds the velocity is increased to Y×X. Given this relationship, a pellet leaving the projector at the instant of acceleration begins, will reach the target at the time acceleration is completed; and at the time it reaches the target will be moving at right angles to its projected direction at X or the original vehicle speed. At this same instant, the body at the point of leaving the projector will be travelling at a speed of Y×X. The remaining bodies would occupy equally spaced positions in the direction in which they were projected and positions related to the zero acceleration position in the target equivalent to the speed of the projector at the time it was set in motion toward the target. The positions where each body strikes the target is a measure of acceleration at the time of its emergence from the projector. Obviously, this relationship may be measured in various ways, either utilizing an actual target or some other means of measurement which might be considered to comprise a virtual target. By means of the tube which I have disclosed, I have, in effect, framed the path of a plurality of freely flying bodies as they fall behind or advance in position with respect to the vehicle and projector. The forces involved may be somewhat more directly and conveniently utilized in the case of a liquid than in the case of freely flying bodies having individually relatively large mass.

While the direction in which the freely flying bodies are projected is preferably at right angles to the direction of movement, changes in which it is desired to measure, I may utilize any angle, with the knowledge that the more acute the angle in general the less will be the accuracy of the instrument. I wish to point out, in addition to the matters discussed above, that accuracy is increased when the speed at which the freely flying bodies are projected is relatively slow as compared to the speeds involved in the direction in which change of speed is measured. In general, also, the further the target is removed from the projector, the greater the accuracy maintained. In practical mechanical installations, however, a limitation must be placed upon some of these factors. In the case where a tube, such as shown in the drawings, is used, an inertia effect becomes important and will introduce a source of error, possibly cause sluggish action and result in at least some over-swinging if the tube is too long.

What I claim as new and desire to protect by Letters Patent of the United States is:

1. An accelerometer device adapted for support by a vehicle, said device comprising means for directing a stream of liquid along a predetermined path, at an angle to a direction in which said vehicle is adapted to move, whereby when said vehicle is subjected to a speed change in said direction of movement, said stream will be caused to deviate from its said path, a pivotally supported tube shaped to frame said stream, whereby deviation of said stream causes a corresponding deviation of said tube, and means for measuring the relative position of said tube whereby to determine the rate of speed change of the vehicle.

2. An accelerometer device as defined in claim 1, wherein said tube is supported to pivot in only a single plane, said plane being at right angles to the direction of movement of the vehicle.

3. An accelerometer device adapted for support by a vehicle, said device comprising a tube having an enlarged upper portion comprising a feed chamber, a support for said tube generally aligned with said upper portion, the said support pivoted in a plane generally at right angles to an axis along which the vehicle is adapted to move, means for continuously delivering liquid to said feed chamber and causing said liquid to be delivered through said tube, whereby a speed change in said vehicle along said axis will cause said tube to pivot due to deviation in a path of said liquid through said tube, and means for indicating the relative movement of said tube.

HENRY R. JACOBS.